(12) United States Patent
Liang et al.

(10) Patent No.: US 10,389,076 B2
(45) Date of Patent: Aug. 20, 2019

(54) EXCITATION DEVICE

(71) Applicant: Zhongguo Liang, Fuxin, Liaoning (CN)

(72) Inventors: Zhongguo Liang, Liaoning (CN); Shidi Liang, Liaoning (CN); Xu Luan, Liaoning (CN); Xinyi Dong, Inner Mongolia (CN)

(\*) Notice: Subject to any disclaimer, the term of this patent is extended or adjusted under 35 U.S.C. 154(b) by 0 days.

(21) Appl. No.: 16/147,816

(22) Filed: Sep. 30, 2018

(65) Prior Publication Data

US 2019/0052039 A1  Feb. 14, 2019

Related U.S. Application Data

(63) Continuation of application No. PCT/CN2016/087969, filed on Jun. 30, 2016.

(30) Foreign Application Priority Data

Mar. 30, 2016 (CN) .......................... 2016 1 0200489

(51) Int. Cl.
| | |
|---|---|
| *H02K 13/00* | (2006.01) |
| *H01R 39/46* | (2006.01) |
| *H01R 39/38* | (2006.01) |
| *H01R 39/415* | (2006.01) |
| *H02K 5/14* | (2006.01) |
| *H02K 13/10* | (2006.01) |

(52) U.S. Cl.
CPC .......... *H01R 39/46* (2013.01); *H01R 39/381* (2013.01); *H01R 39/385* (2013.01); *H01R 39/415* (2013.01); *H02K 5/145* (2013.01); *H02K 13/105* (2013.01); *H01R 2201/10* (2013.01); *H02K 2205/06* (2013.01)

(58) Field of Classification Search
CPC .... H02K 13/00; H02K 2205/06; H02K 5/141; H02K 5/148; H01R 39/381; H01R 39/385; H01R 39/40; H01R 39/58
See application file for complete search history.

(56) References Cited

U.S. PATENT DOCUMENTS

| | | | | |
|---|---|---|---|---|
| 3,968,391 | A * | 7/1976 | Blank ................... | H02K 5/141 310/240 |
| 5,043,619 | A * | 8/1991 | Kartman, Jr. ........ | H01R 39/381 310/239 |
| 7,608,970 | B2 * | 10/2009 | Eger ...................... | H01R 39/40 29/732 |

FOREIGN PATENT DOCUMENTS

| | | |
|---|---|---|
| CN | 201156640 Y | 11/2008 |
| CN | 201444528 U | 4/2010 |
| CN | 202513428 U | 10/2012 |
| CN | 203056348 U | 7/2013 |
| CN | 203521853 U | 4/2014 |
| CN | 204118923 U | 1/2015 |

(Continued)

*Primary Examiner* — Dang D Le
(74) *Attorney, Agent, or Firm* — Wayne & Ken, LLC; Tony Hom

(57) ABSTRACT

Disclosed is an excitation device which includes a brush holder base. The brush holder base is provided with a plug. The plug is provided with a brush holder shaft. The front end of the brush holder shaft is provided with a brush box. A horizontal taper dovetail groove is formed in the brush holder base. A horizontal taper dovetail lug boss is disposed on the plug. The dovetail groove is matched with the dovetail lug boss. The present invention solves the problem of potential safety hazard in locking, and ensures safe and smooth operation of a unit.

7 Claims, 10 Drawing Sheets

(56) References Cited

FOREIGN PATENT DOCUMENTS

| | | |
|---|---|---|
| CN | 105703191 A | 6/2016 |
| CN | 205406930 U | 7/2016 |

\* cited by examiner

EXCITATION DEVICE

CROSS-REFERENCE TO RELATED APPLICATIONS

This application is a continuation of international Application No. PCT/CN2016/087969, filed on Jun. 30, 2016 which claims the benefit of priority from Chinese Application No. 201610200489.6, filed on Mar. 30, 2016. The content of the aforementioned applications, including any intervening amendments thereto, are incorporated herein by reference.

TECHNICAL FIELD

The present invention relates to the technical field of power accessories, and particularly relates to an excitation device for an electric generator or an electric motor.

BACKGROUND OF THE PRESENT INVENTION

Electricity is closely related to human life. Safe and smooth operation of thermal power plants directly affects the residents and all industries of a city.

A generator excitation system is a core component of power transmission and its safe and smooth operation is the premise of safe and smooth operation of the whole electric generator.

A combined brush holder is a key component installed on the generator set excitation system. Its mechanical principle, technical performance stability and firmness of assembly parts directly affect the operation of a generator set. The lock of a brush holder box and a brush is an important component of the generator excitation system. Accidents of the generator set are mostly caused by an excitation confluence system. The reason is generally that a brush holder locking device is loose and the electric spark is generated; or screws and nuts fall, and the entire system is burned due to the spark caused by electrical conduction.

An old combined brush holder has many assembly parts. Because components such as screws fall during work and then the confluence system is burned, the shutdown phenomenon of the generator set occurs occasionally. In addition, the connection and installation of conductive accessories in the combined brush holder, the area of a contact surface and the steadiness of combination are fundamental to make the current pass through and make the excitation system work stably. Due to the instability of the contact surface and small combination area of the old combined brush holder, improper high-temperature operation of the system is often caused.

SUMMARY OF THE PRESENT INVENTION

The technical problem to be solved by the present invention is to overcome the problems in the prior art, to provide an excitation device for an electric generator.

An excitation device includes a brush holder base, wherein the brush holder base is provided with a plug; the plug is provided with a brush holder shaft; the front end of the brush holder shaft is provided with a brush box; a horizontal taper dovetail groove is formed in the brush holder base; a horizontal taper dovetail lug boss is disposed on the plug; and the dovetail groove is matched with the dovetail lug boss.

Vertical inclined angles of the dovetail groove and the dovetail lug boss are respectively 26°-28°, and horizontal inclined angles are respectively 73°-75°.

A leaf spring brush locking press plate is disposed on the front end of the brush holder shaft; and the brush holder shaft is provided with a roller shaft mechanism which contacts with the leaf spring brush locking press plate. The leaf spring brush locking press plate is controlled by the rotation of the brush holder shaft roller to realize a self-locking function of the brush. A leaf spring is stainless spring steel.

A brush handle is disposed on the rear end of the brush holder shaft; a baffle plate is disposed between the brush handle and the brush holder shaft; and a spring is disposed on the brush holder shaft near the brush handle end.

The upper end of the spring is provided with a first spring bowl; the lower end of the spring is provided with a second spring bowl; the first spring bowl is larger than the second spring bowl; and the first spring bowl is matched with the second spring bowl to play the roles of fixing and protecting the spring.

The leaf spring brush locking press plate includes an upper press plate and a lower press plate; a press head is disposed on the front end of the upper press plate; and the lower press plate and the upper press plate are assembled and connected through copper rivets.

The press head is riveted on the leaf spring of the front end of the upper press plate; and an anti-skid grid is disposed on the press head.

The roller shaft mechanism includes a roller shaft rod installed on the brush holder shaft; a roller is disposed on the roller shaft rod; the roller contacts with a bottom surface of the lower press plate; and the roller shaft rod is connected with the brush holder shaft through a roller nut, so as to reduce frictional force and reduce working strength.

A prepressing and positioning pin for prepressing and locking the plug is disposed on the brush holder shaft. The force of the spring is released by rotating compression through a helix angle of the dovetail plug, so as to generate axial displacement, thereby realizing prepressing and locking effects.

A locking and positioning pin is disposed on the brush holder shaft. The locking and positioning pin is matched with the baffle plate of a socket. After the prepressing and positioning pin releases the acting force of the spring, brush holder positioning and locking effects are realized.

All positioning pins adopt elastic straight pin of high-quality spring steel; so as to ensure that the positioning pins do not fall during use.

Beneficial effects: The present invention solves the problem of potential safety hazard in locking, and ensures safe and smooth operation of a unit. The taper-dovetail combined brush holder makes up and changes the deficiencies of an old brush holder, increases a conductive contact surface, enhances the work stability of the brush holder, reduces auxiliary accessories of the base, and enhances the work safety of the brush holder. The brush box and the brush holder base are mechanically matched stably; and thus, the brush is operated more smoothly in the brush holder, current output of an excitation system is more stable and balanced, and the service life of the brush holder is also prolonged. The device overcomes the action of the spring force of the old brush holder through a prepressing and locking principle, so that maintenance and replacement of the brush are convenient, time saving and labor saving. The prepressing and locking principle is to compress the spring through the helix angle while locking the brush, and rotate reversely after installation to release the spring force through the helix angle, so as to play a locking effect.

BRIEF OF THE DRAWINGS

The present invention is described below in detail in combination with drawings and specific embodiments.

DETAILED OF THE PRESENT INVENTION

Figure 1:
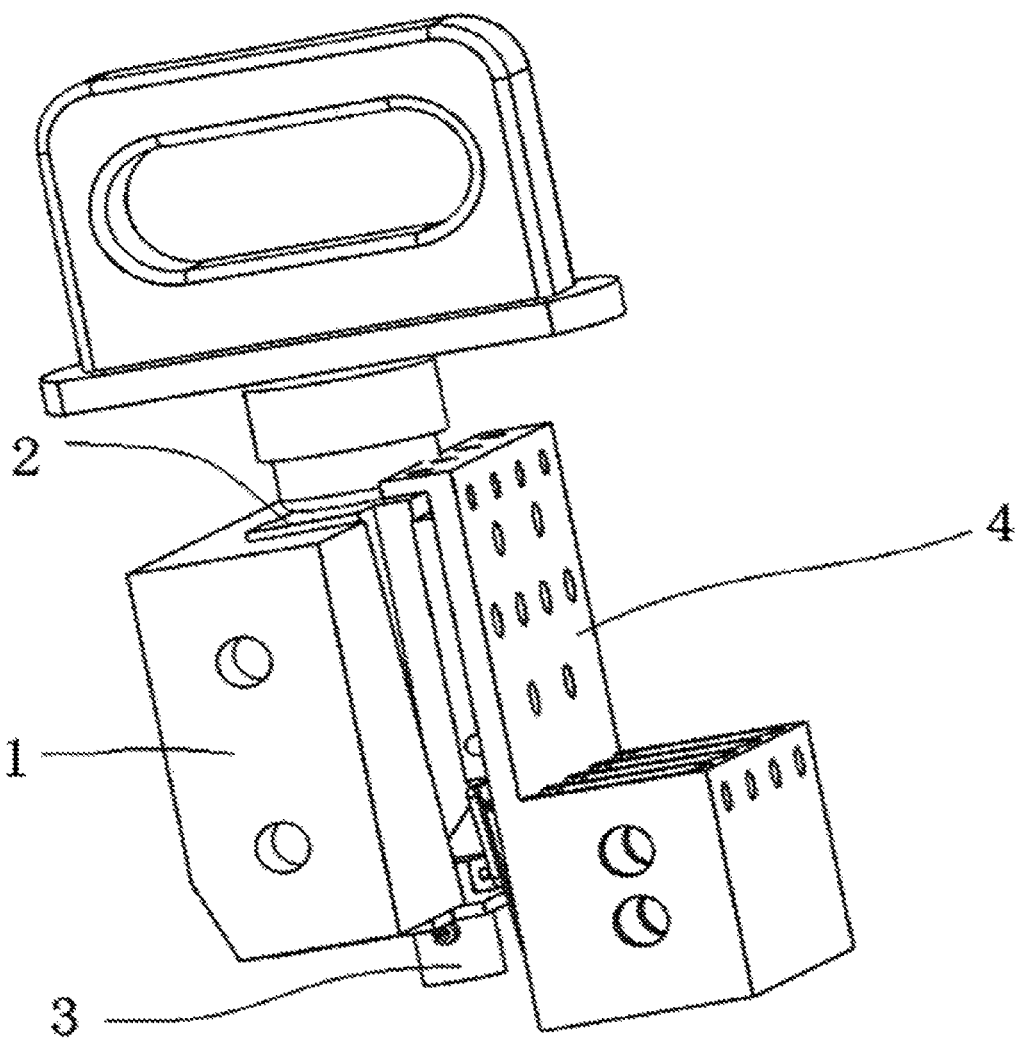
FIG. 1 is an integral structural schematic diagram of a brush holder in an embodiment of the present invention.

To easily understand the technical means achieved by the present invention, creative features, achieved purpose and effects, the present invention is further illustrated below as shown in FIG. 1-FIG. 10.

The excitation device in the present embodiment is a brush holder which can be used in similar fields such as generator systems.

The present embodiment includes a brush holder base 1, wherein the brush holder base is provided with a plug 2; and the plug 2 is in inserting fit with the brush holder base 1. The plug 2 is provided with a brush holder shaft 3; and the front end of the brush holder shaft is provided with a brush box 4.

When the brush box 4 is removed, it can be seen that a horizontal taper dovetail groove 11 is formed in the brush holder base 1; a horizontal taper dovetail lug boss 21 is disposed on the plug 2; and the dovetail groove 11 and the dovetail lug boss 21 are completely matched and have consistent dimensions.

When the brush holder base 1 is removed, the dovetail lug boss 21 on the plug 2 can be seen.

The plug 2 and the brush holder base 1 are mutually embedded, wherein vertical inclined angles of the dovetail lug boss 21 and the dovetail groove 11 are 26°-28°, and horizontal inclined angles are 73°-75°. This solution is convenient for plugging and unplugging the plug 2.

A leaf spring brush locking press plate 41 is disposed on the front end of the brush holder shaft 3. The brush locking press plate is made of stainless spring steel. During work, the brush holder shaft 3 rotates to drive a brush holder shaft roller 432, and generates a push force for the brush locking press plate 41, thereby achieving the self-locking function of the brush. The brush holder shaft 3 rotates to drive the brush holder shaft roller 432 to rotate within a range of 90°. When the brush holder shaft 3 rotates to a highest position of the roller 432, the locking force for the brush locking press plate 41 is largest. At this moment, a notch on the brush holder shaft 3 is aligned with a tail hook 44 of the locking press plate 41. When the brush holder shaft 3 rotates to a lowest position of the roller 432, the locking press plate 41 is not locked under the effect of an external force of the brush box. At this moment, the brush holder shaft 3 can be pulled out.

A brush handle 5 is disposed on the rear end of the brush holder shaft 3; a baffle plate 6 is disposed between the brush handle 5 and the brush holder shaft 3; and a spring 7 is disposed on the brush holder shaft 3 near the brush handle end. The upper end of the spring 7 is provided with a first spring bowl 71; the lower end of the spring 7 is provided with a second spring bowl 72; the first spring bowl 71 is larger than the second spring bowl 72; and the first spring bowl 71 is matched with the second spring bowl 72 to play the roles of fixing and protecting the spring.

Figure 2:
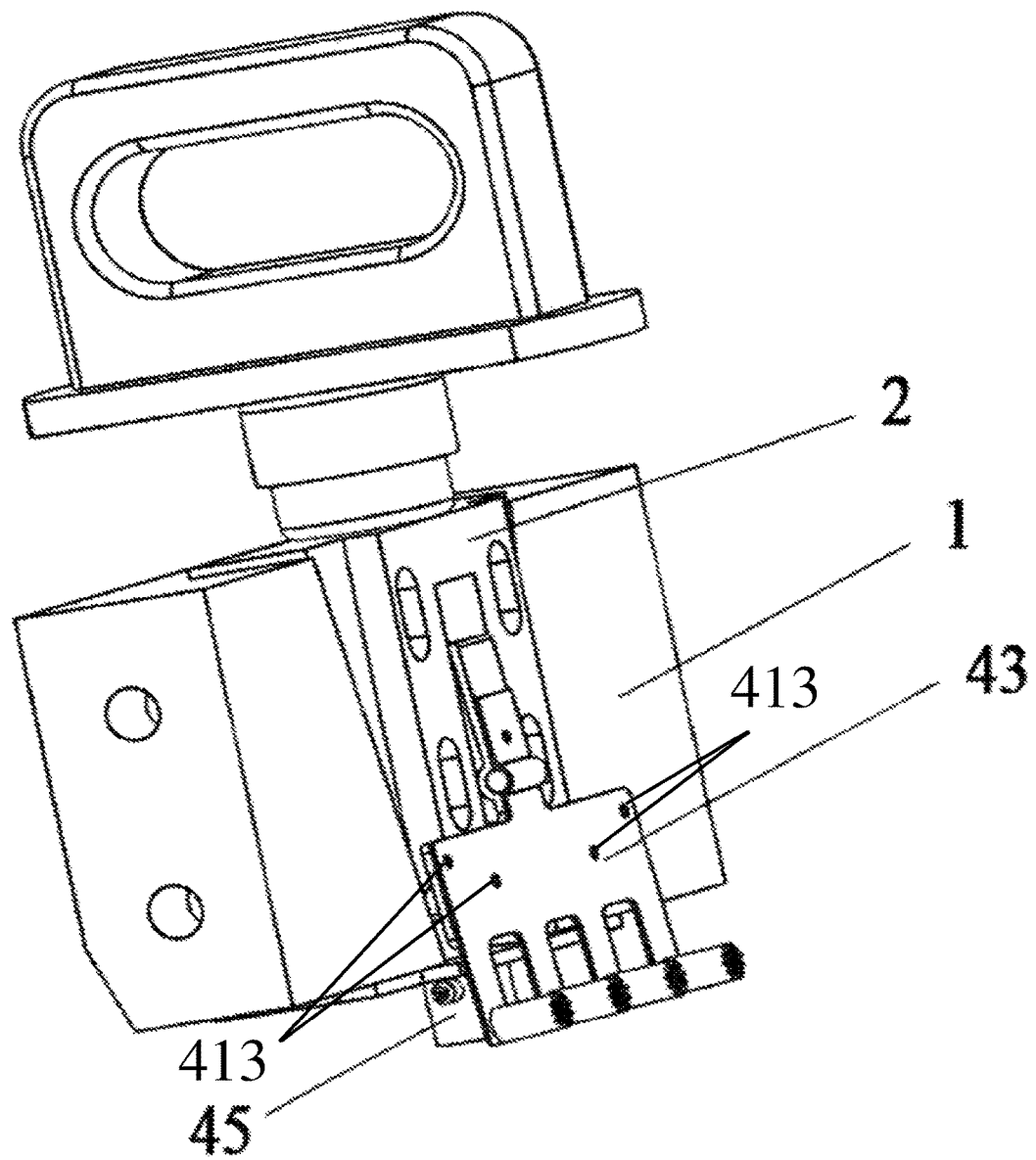
FIG. 2 is an exploded structural schematic diagram of a brush holder when a brush box is removed in an embodiment of the present invention.
Figure 3:
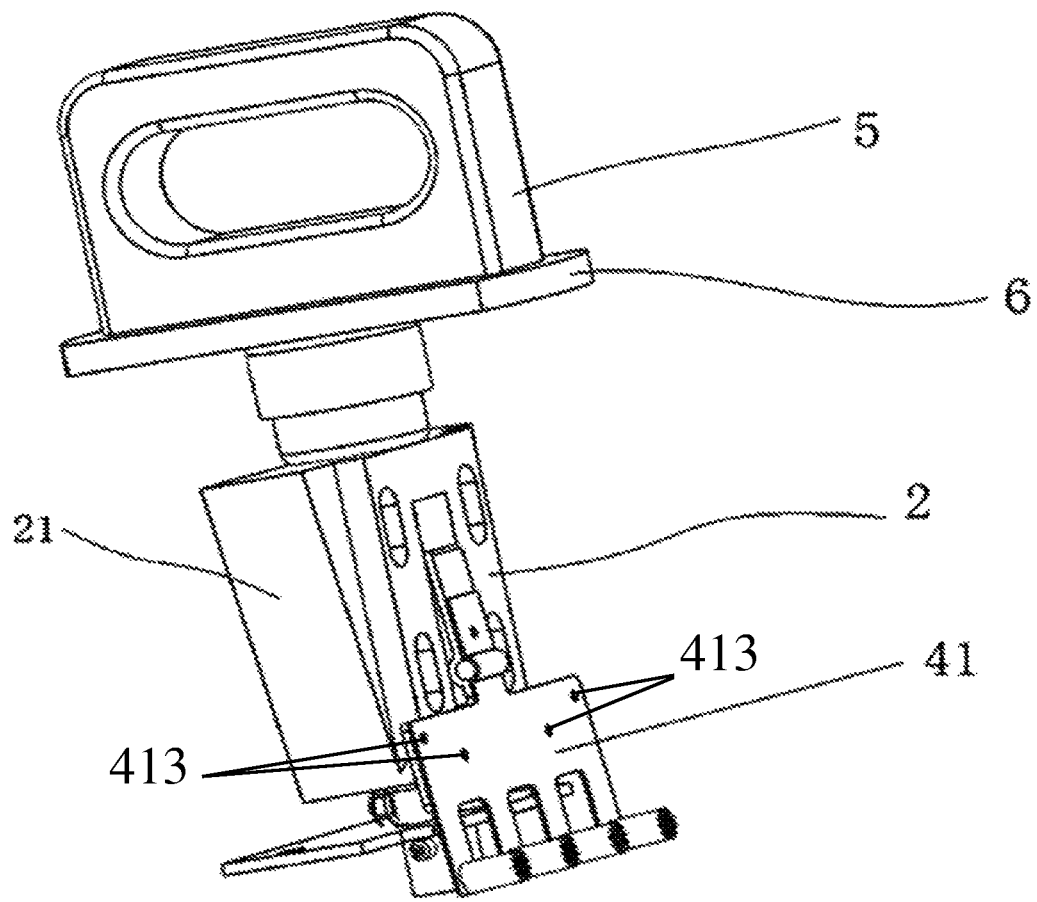
FIG. 3 is an exploded structural schematic diagram of a brush holder when a base is removed in an embodiment of the present invention.
Figure 4:
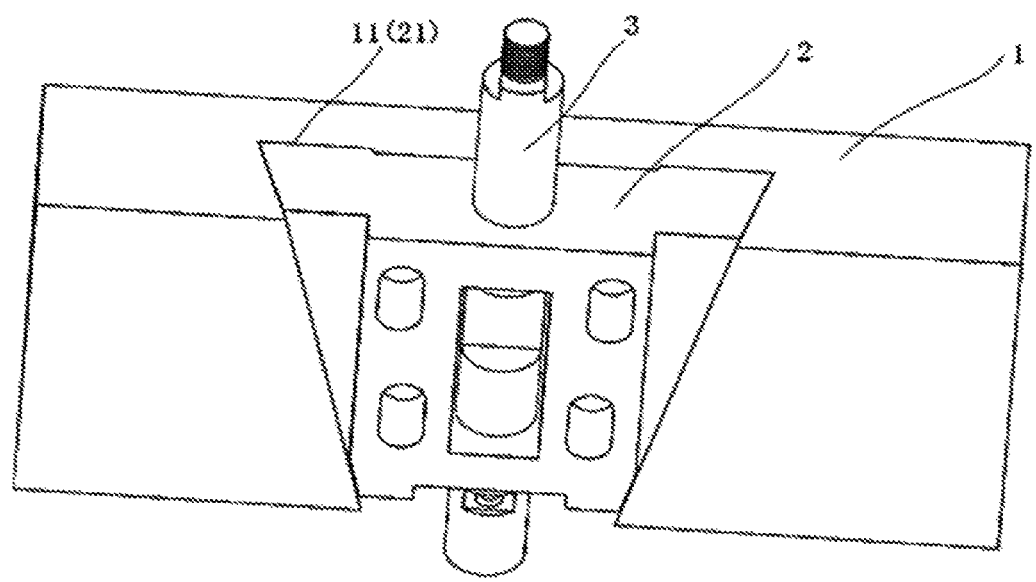
FIG. 4 is a schematic diagram of matching between a plug and a base in an embodiment of the present invention.
Figure 5:
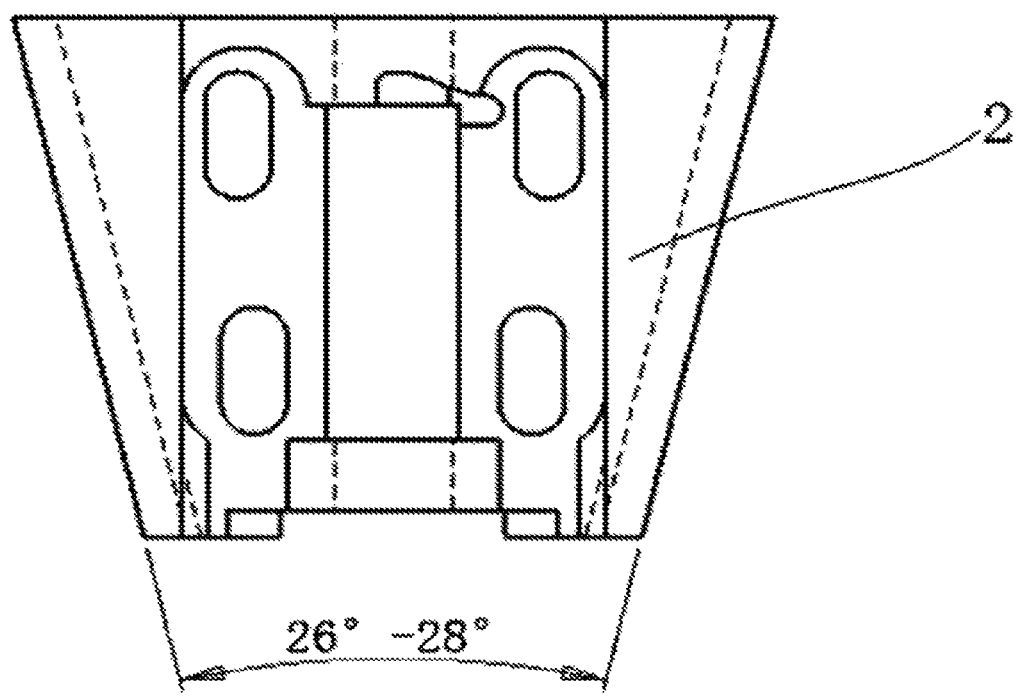
FIG. 5 is a directional schematic diagram of a plug in an embodiment of the present invention.
Figure 6:
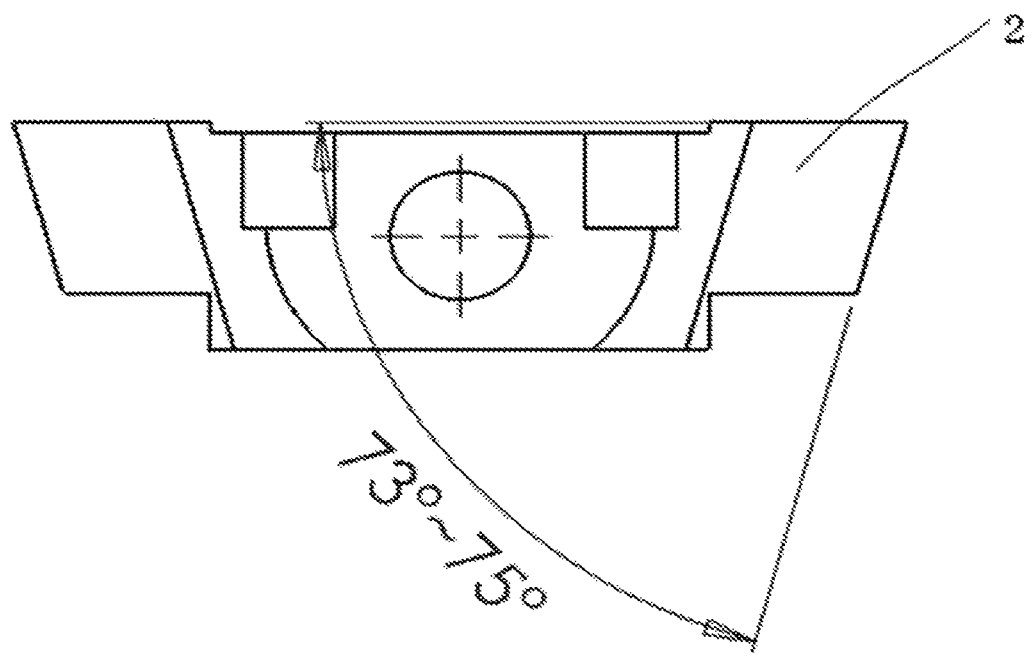
FIG. 6 is another directional schematic diagram of a plug in an embodiment of the present invention.
Figure 7:
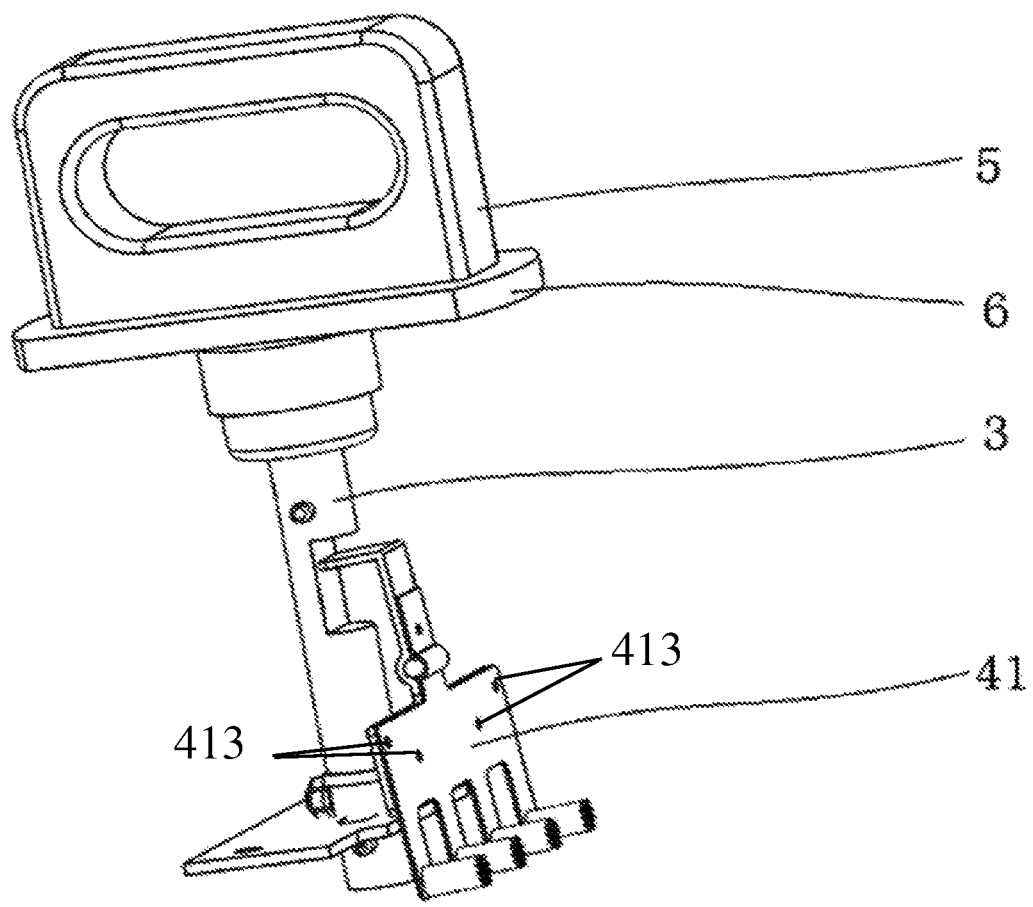
FIG. 7 is a structural schematic diagram of a brush holder when a brush holder base and a plug are removed in an embodiment of the present invention.
Figure 8:
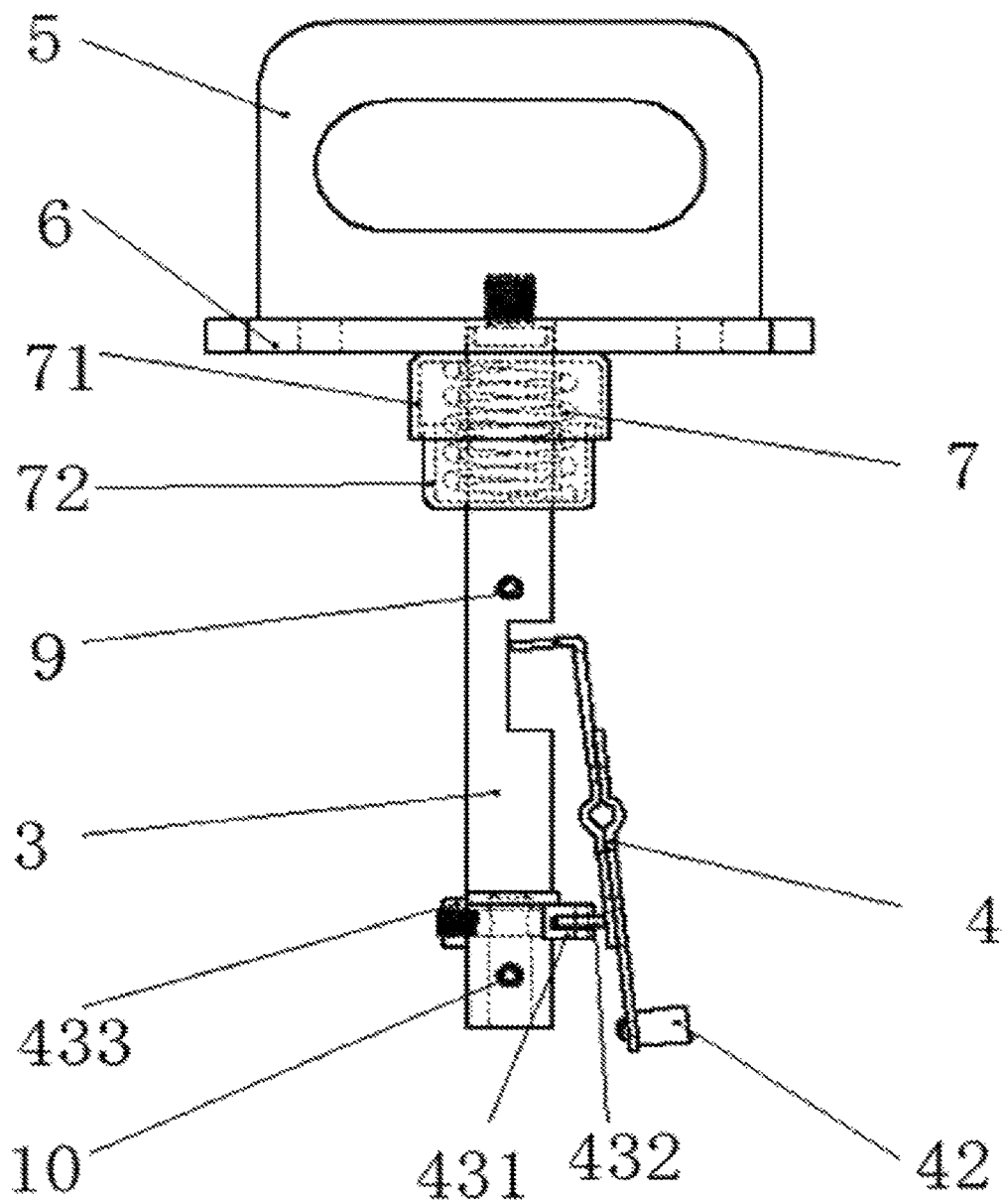
FIG. 8 is a structural schematic diagram of a side surface of FIG. 5.
Figure 9:
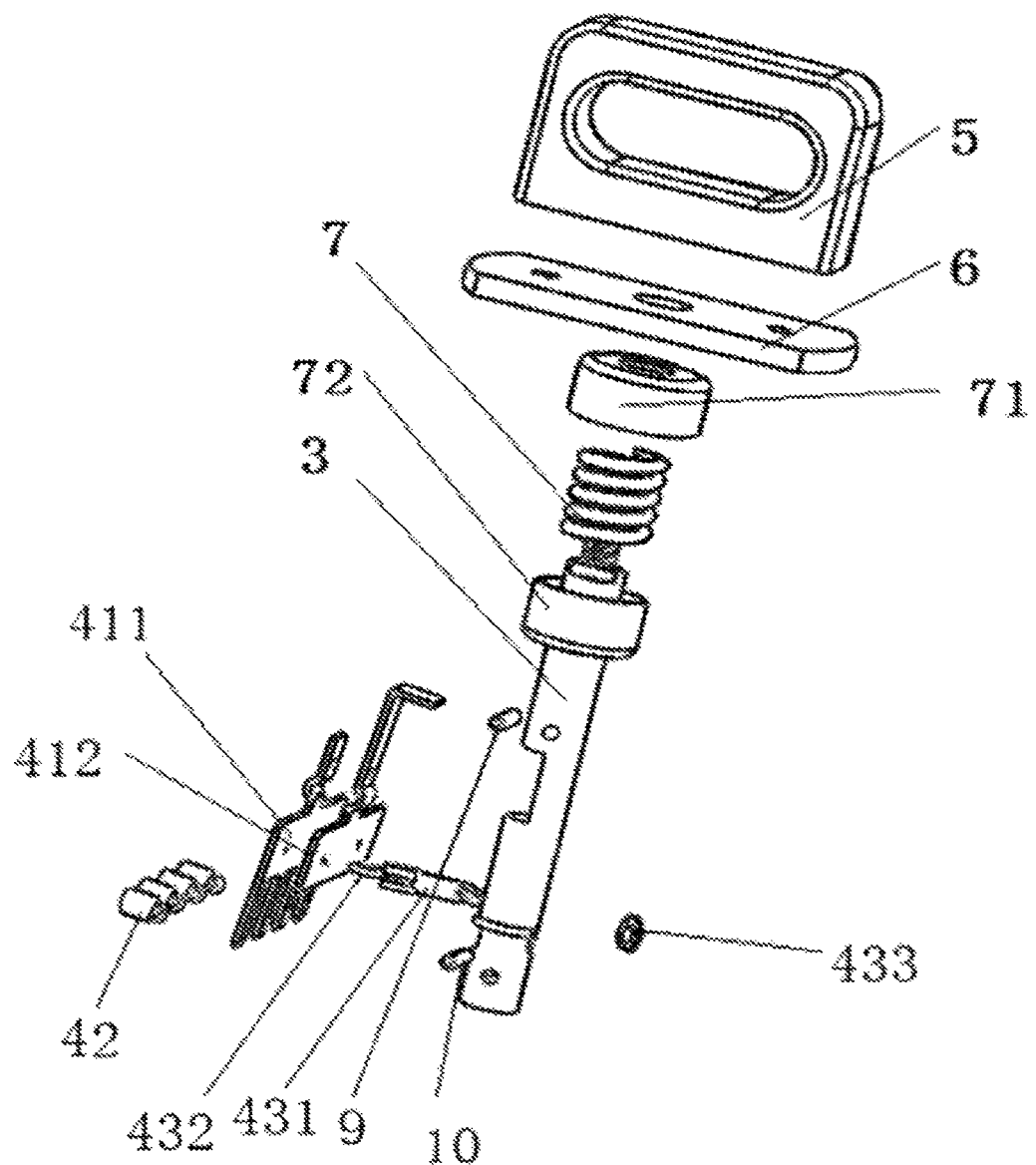
FIG. 9 is an exploded structural schematic diagram of FIG.
Figure 10:
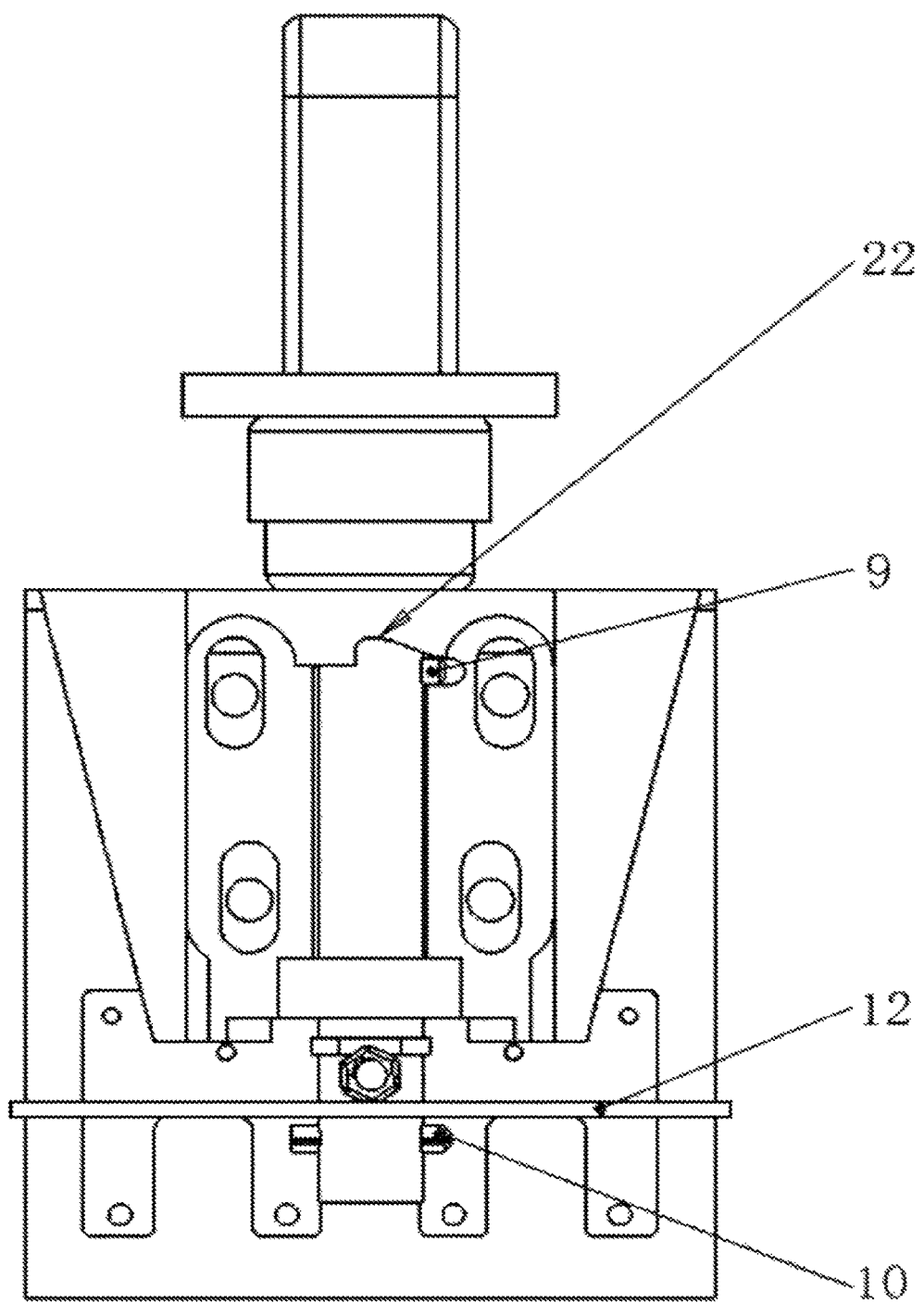
FIG. 10 is a schematic diagram of matching between a helix angle and a positioning pin in an embodiment of the present invention.

The leaf spring brush locking press plate 41 includes an upper press plate 411 and a lower press plate 412; a press head 42 is disposed on the front end of the upper press plate; and the lower press plate and the upper press plate are connected and assembled through copper rivets 413, as shown in FIGS. 2, 3 and 7.

The press head 42 is riveted on the leaf spring 45 of the front end of the upper press plate 411; and an anti-skid grid is disposed on the press head 42.

The brush holder shaft 3 is provided with a roller shaft mechanism 43 which contacts with the leaf spring brush locking press plate 41. The roller shaft mechanism 43 includes a roller shaft rod 431 installed on the brush holder shaft 3; a roller 432 is disposed on the roller shaft rod; the roller 432 contacts with a bottom surface of the lower press plate 412; and the roller shaft rod 431 is connected with the brush holder shaft 3 through a roller nut 433. The brush holder shaft 3 rotates to drive the roller shaft rod 431 to rotate together, so that the roller 432 extrudes the bottom surface of the lower press plate 412. In this solution, the roller reduces frictional force and reduces working strength.

A helix angle 22 is disposed on the plug 2. The helix angle 22 is an obliquely upward notch. A prepressing and positioning pin 9 for prepressing and locking the plug is disposed on the brush holder shaft 3. After the prepressing and positioning pin 9 is installed, the prepressing and positioning pin 9 rotates within a range limited by the helix angle 22, thereby generating axial displacement and realizing prepressing and locking effects through the spring force.

A locking and positioning pin 10 is disposed on the brush holder shaft 3. The locking and positioning pin 10 is matched with the baffle plate 12 of a socket. After the prepressing and positioning pin 9 releases the acting force of the spring, brush holder positioning and locking effects are realized.

All positioning pins adopt elastic straight pin of high-quality spring steel, so as to ensure that the positioning pins do not fall during use.

The present embodiment solves the problem of potential safety hazard in locking, and ensures safe and smooth operation of a unit. The taper-dovetail combined brush holder makes up and changes the deficiencies of an old brush holder, increases a conductive contact surface, enhances the work stability of the brush holder, reduces auxiliary accessories of the base, and enhances the work safety of the brush holder. The brush box and the brush holder base are mechanically matched stably; and thus, the brush is operated more smoothly in the brush holder, current output of an excitation system is more stable and balanced, and the service life of the brush holder is also prolonged. The device overcomes the action of the spring force of the old brush holder through a prepressing and locking principle, so that maintenance and replacement of the brush are convenient, time saving and labor saving. The prepressing and locking principle is to compress the spring through the helix angle while locking the brush, and rotate reversely after installation to release the spring force through the helix angle, so as to play a locking effect The above shows and describes the basic principle, main features and advantages of the present invention. Those skilled in the art shall understand that the present invention is not limited by the above embodiments. The above embodiments and the description only describes the principle of the present invention. Various changes and improvements can be made to the present invention without departing from the spirit and the scope of the present invention, and these changes and improvements are included in the claimed scope of the present invention. The claimed scope of the present invention is defined by appended claims and equivalents.

What is claimed is:

1. An excitation device, comprising a brush holder base, wherein the brush holder base is provided with a plug; the plug is provided with a brush holder shaft; the front end of the brush holder shaft is provided with a brush box; a horizontal taper dovetail groove is formed in the brush holder base; a horizontal taper dovetail lug boss is disposed on the plug; the horizontal taper dovetail groove is matched with the horizontal taper dovetail lug boss; a leaf spring brush locking press plate is disposed on the front end of the brush holder shaft; the brush holder shaft is provided with a roller shaft mechanism which contacts with the leaf spring brush locking press plate; the leaf spring brush locking press plate comprises an upper press plate and a lower press plate; a press head is disposed on the front end of the upper press plate; the lower press plate and the upper press plate are assembled and connected through copper rivets; the roller shaft mechanism comprises a roller shaft rod installed on the brush holder shaft; a roller is disposed on the roller shaft rod; the roller contacts with a bottom surface of the lower press plate; and the roller shaft rod is connected with the brush holder shaft through a roller nut.

2. The excitation device according to claim 1, wherein vertical inclined angles of the horizontal taper dovetail groove and the horizontal taper dovetail lug boss are respectively 26°-28°, and horizontal inclined angles are respectively 73°-75°.

3. The excitation device according to claim 1, wherein a brush handle is disposed on the rear end of the brush holder shaft; a baffle plate is disposed between the brush handle and the brush holder shaft; and a spring is disposed on the brush holder shaft near the brush handle end.

4. The excitation device according to claim 3, wherein the upper end of the spring is provided with a first spring bowl; the lower end of the spring is provided with a second spring bowl; the first spring bowl is larger than the second spring bowl; and the first spring bowl is matched with the second spring bowl.

5. The excitation device according to claim 1, wherein the press head is riveted on a leaf spring of the front end of the upper press plate.

6. The excitation device according to claim 1, wherein a prepressing and positioning pin for prepressing and locking the plug is disposed on the brush holder shaft; a helix angle is also disposed on the plug; and the prepressing and positioning pin rotates within a range limited by the helix angle.

7. The excitation device according to claim 1, wherein a locking and positioning pin is disposed on the brush holder shaft.

* * * * *